May 4, 1943.   H. W. ADDISON, JR   2,318,187
AUTOMATIC CONTROL FOR FLUID TRANSMISSIONS
Filed April 17, 1940
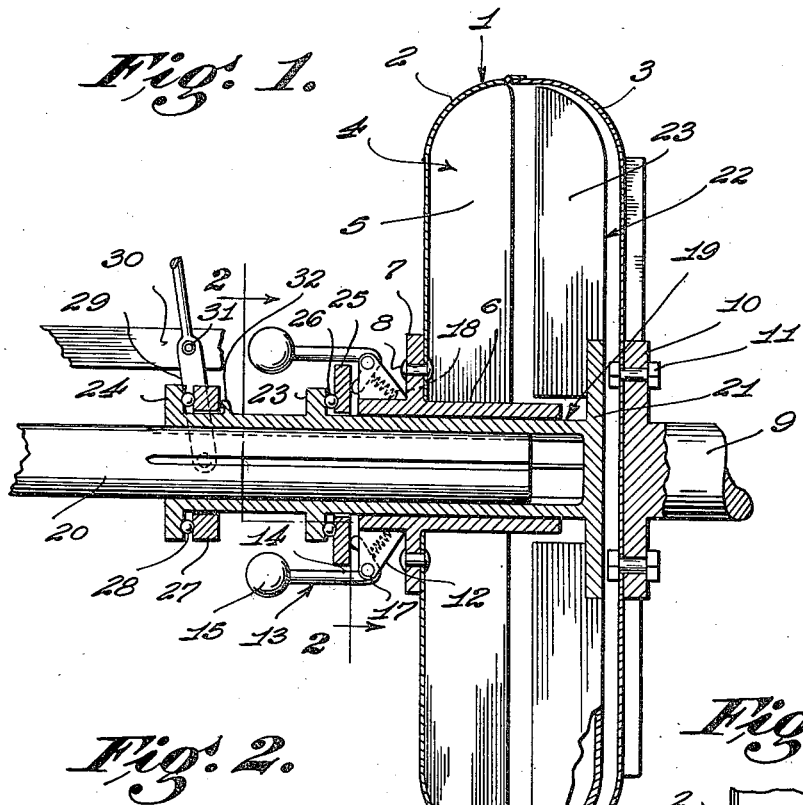
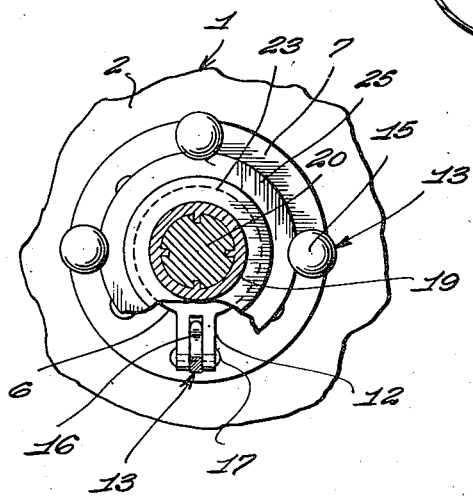
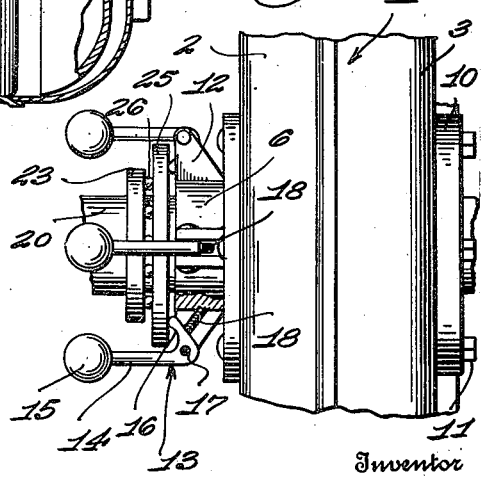
Inventor
H. W. Addison Jr.
By Lacey & Lacey, Attorneys Patented May 4, 1943

2,318,187

UNITED STATES PATENT OFFICE 2,318,187

AUTOMATIC CONTROL FOR FLUID TRANSMISSIONS

Harry W. Addison, Jr., Marshall, Minn.

Application April 17, 1940, Serial No. 330,228

2 Claims. (Cl. 60—54)

This invention relates to an improved automatic control for fluid transmissions.

As is well known, the most popular type of fluid transmission includes a drive rotor and a driven rotor, which rotors are mounted in a fluid-tight casing. Power is transmitted from the drive rotor to the driven rotor through the medium of the fluid between said rotors. It will be understood that, when these rotors are maintained in close face to face proximity to each other, the driven rotor will be rotated by rotation of the drive rotor, due to the fluid connection, and the movement of both of said rotors will be nearly synchronized. However, when the drive and driven rotors are disposed with their faces at considerable distance from each other, rotation of the drive rotor will exert but little torque on the driven rotor. In other words, the fluid in the casing will have little effect on the driven rotor when the two rotors are widely separated. The torque exerted on the driven rotor may be increased, by decreasing the clearance between the rotors, to a point at which the torque exerted on the driven rotor will equal the power requirement, i. e., the point at which the maximum available drive power will be exerted as torque on the driven rotor, except for loss due to friction. If the clearance between the rotors could be perfectly controlled, the following ideal condition could be made to exist, except for losses due to friction: All available power, at any given engine speed, would be transmitted to the drive wheels so that the full developed power of the engine would be available for acceleration regardless of the speed of said drive wheels.

One of the principal objects of the present invention is to provide an automatic control for fluid transmissions which will approximate the above outlined ideal condition.

Another object of the invention is to provide an automatic control for fluid transmissions employing means for automatically controlling the clearance between the drive rotor and the driven rotor so that the ratio between a drive shaft and a driven shaft, through a fluid medium, may be effectively controlled.

A further object of the invention is to provide mechanism of this character wherein means are employed for permitting manual control of the clearance between the rotors, when desired.

A further object of the invention is to provide an automatic control mechanism for fluid transmissions which will be characterized by the utmost simplicity in construction and ease of operation.

And a still further object of the invention is to provide an automatic control for fluid transmissions wherein a number of different forces are combined effectively to control the ratio between a drive shaft and driven shaft, through a fluid transmission.

Other objects of the invention will become apparent during the course of the following description.

In the drawing:

Figure 1 is a longitudinal sectional view of my improved automatic control as it would appear mounted on a fluid transmission, certain of the parts being shown in elevation, Figure 2 is a vertical sectional view on the line 2—2 of Figure 1 looking in the direction of the arrows, and Figure 3 is a detail plan view, partly in section, showing the automatic control mechanism on the fluid transmission.

Referring now to the drawing, wherein like numerals of reference will be seen to designate like parts throughout the various views, the numeral 1 indicates in general the casing of a fluid transmission. The casing 1 includes a pair of sections 2 and 3. The section 2 carries an integral driving rotor 4 which includes a plurality of radially extending driving vanes 5. The vanes 5 are mounted on the section 2 and also on a drive sleeve 6. The drive sleeve 6 extends within the casing 1 and also projects outwardly therefrom. Said drive sleeve is formed with an attaching flange 7 through which are extended rivets 8 for securing the drive sleeve rigidly with respect to the casing axially thereof.

A drive shaft 9 has its rear end portion terminating in a mounting flange 10. The mounting flange 10 is disposed axially with respect to the section 3 of the casing 1, and is secured to said casing by means of bolts 11, which extend through the mounting flange at spaced points about its circumference. It will now be seen that, by rotating the drive shaft 9, the casing 1, with the driving rotor 4 therein, will be rotated. The driving sleeve 6 will, of course, also rotate with the casing 1.

Mounted on the driving sleeve 6 near its outer extremity, and at spaced points about its circumference, are mounting yokes 12. The yokes 12 are preferably four in number. It should be understood, however, that any desired number may be employed. The mounting yokes 12 pivotally mount governor weights 13. The governor weights are identical in construction so that a description of one will suffice for all. A typical governor weight includes a shank 14, a ball 15, which is disposed at the outer end of said shank 14, and an obtuse angularly disposed lever 16 which is mounted at the inner end of the shank 14. A pivot bolt 17 extends through the corresponding extremities of each of the yokes 12 and through the governor weights, for effectively mounting said governor weights on the yokes. As will be seen by referring to Figures 1 and 3, the pivot bolts extend through the governor weights at the junction of the shank 14 and lever 16 of each of said weights. Compression coil springs 18 are provided, one of said coil springs being mounted between the arms of each of the yokes 12 and extending from the base of said yokes to the under faces of the levers 16 of the weights 13.

Mounted within the drive sleeve 6, to rotate freely with respect to the drive sleeve, is a driven sleeve 19. The driven sleeve 19 is splined on a driven shaft 20 and is, therefore, movable longitudinally with respect to said driven shaft. The driven sleeve 19 is, of course, locked to rotate with the driven shaft 20.

Mounted on the driven sleeve 19, at its inner end, is a hub 21 of a driven rotor 22. The driven rotor is of the same general contour as the driving rotor 4. The driven rotor includes vanes 23 which are preferably of the same number as the vanes of the driving rotor 4. As will be seen by referring to Figure 1, the inner edges of the vanes 23 of the driven rotor are disposed to confront the inner edges of the vanes of the driving rotor. The driven rotor may be shifted toward or away from the driving rotor by shifting the driven sleeve 19. The manner of shifting this sleeve will be brought out presently.

The driven sleeve 19 is provided with thrust bearing elements 23ª and 24, the thrust bearing element 23ª being located substantially three-fourths of the length of the sleeve away from the hub 21 while the thrust bearing element 24 is disposed at the opposite end of the sleeve 19 from the hub 21. The thrust bearing element 23ª cooperates with a freely movable thrust bearing ring 25 through the medium of ball bearings 26. It should be understood that, if desired, a roller bearing arrangement may be employed. The thrust bearing ring 25 is relatively wide, with respect to the element 23ª, and has its outer face disposed to confront the end of the drive sleeve 6 so that the free ends of the levers 16 will contact the said outer face of the ring 25.

A thrust bearing ring 27 is mounted to cooperate with the thrust bearing element 24, through the medium of ball bearings 28. The thrust bearing ring 27 has a manual shift lever 29 pivotally connected thereto, and said manual shift lever 29 is fulcrumed on a portion of the frame 30 of a vehicle by means of a pivot bolt 31. The manual shift lever 29 projects above the frame 30 for convenient manual engagement. As will be seen, a stop lug 32 prevents accidental displacement of the thrust bearing ring 27 with respect to the thrust bearing element 24. If desired, a thrust bearing may be used in place of the lug 32.

The operation of my improved automatic control for fluid transmissions will now be set forth. The casing 1 will be normally filled to a proper level with oil or other suitable fluid. When the device is not in motion, the springs 18 will extend the weights 15 to their outermost position and the driven rotor will be drawn close to the driving rotor. Now, as the driving rotor is rotated at a moderate speed, the shearing action of the liquid will force the driven rotor away from the driving rotor, provided the required torque is great enough to cause this action to overpower the springs 18 and the centrifugal force of the weights 15. The device is illustrated in this position, with all forces acting.

Now, if the speed of the driving rotor is increased, the centrifugal force on the weights 15, plus the force of the springs 18, will draw the driven rotor back toward the driving rotor until the required torque is delivered to the driven rotor or until the engine will not accelerate further against the increasing power demand being imposed on it.

It should be understood that the control device is shown in an operative position but that, in actual use, it will remain inoperative (the driving and driven rotors will be close together) except when more than normal torque is required for acceleration. The force of the springs 18 which tend to decrease the clearance between the driving and driven rotors is governed only by the strength and construction of said springs. The force exerted by the weights, which force tends to decrease the clearance between the rotors, is governed by the size of the balls 15 and the lengths of the shanks 14. The force varies directly with the speed at which the drive sleeve, shaft and rotor revolve.

Should certain conditions exist which would require that the driven rotor be shifted into closer proximity to the driving rotor, it is only necessary to rock the lever 29, when the driven sleeve may be shifted along the shaft 20 for shifting the rotor 22 toward the rotor 4. It is obvious that the lever 29 would be more positive in action for controlling the clearance between the rotors than would the automatic control, and would, therefore, be used to control the automatic mechanism should unusual conditions exist.

It should be understood that, in this specification, the term clearance between the rotors is intended to mean the total area of the space between the edges of the drive vanes and the edges of the driven vanes, it being presumed that the vanes are in alinement. Although in no way essential to the operation of my invention, it is assumed that the vanes of each rotor are adjustable as a unit.

Summarizing for the sake of clearness, it will be understood that, when the transmission is in operation, a number of forces will govern the clearance between the rotors. For example, a force, exerted by the fluid within the casing, tends to increase the clearance between the rotors. This force varies directly with the effort exerted on the driven rotor. In addition, there is a force exerted by the springs 18, which tends to decrease the clearance between the rotors 4 and 22. This second-mentioned force is governed only by the strength of the springs themselves. The governor weights, when the driving rotor is rotated, tend to decrease the clearance between the rotors. As stated hereinbefore, this third mentioned force is governed by the size of the weight balls 15 and the lengths of the shanks 14 and the levers 16. This force obviously varies with the speed at which the driving rotor rotates so that, by increasing the speed of the driving rotor, the driven rotor will automatically be brought into closer proximity to said driving rotor.

The above mentioned forces will cooperate for effectively controlling the ratio between the drive shaft 9 and the driven shaft 20, through the medium of the fluid in the casing 1. This arrangement permits all available power, at any given engine speed, to be transmitted to the drive wheels. Therefore, the full developed power of the engine would be available for acceleration regardless of the speed of the drive wheels.

It is thought that the construction and operation of my improved automatic control for fluid transmissions will now be thoroughly understood.

Having thus described the invention, what is claimed as new is:

1. In combination with a driving shaft and a driven shaft, a device of the class described including a casing to contain liquid and including sections, one of said sections being connected to the driving shaft and the other of said sections surrounding the end of the driven shaft, a driving sleeve carried by the other of said sections, a driving rotor in the casing and connected with the last mentioned section, a driven rotor, means connecting the driven rotor to rotate with the driven shaft and the driving sleeve, and means for automatically positioning the driven rotor with respect to the driving rotor whereby the maximum available driving power may be exerted as torque on the driven rotor, said last mentioned means including a weight pivotally mounted on the driving sleeve and engaging the driven sleeve for shifting the driven rotor toward the driving rotor, a spring urging the weight outwardly for positioning the driving sleeve and driven rotor in close proximity to the driving rotor at slow speed, said driving and driven rotors being shifted apart by shearing action of liquid in the casing at moderate speed, said weight shifting the driven rotor toward the driving rotor at high speed.

2. A mechanism of the class described including a casing to contain transmission fluid and having a driving rotor therein, means connecting the casing to a driving shaft, said casing having a driving sleeve, a driven rotor within the casing, a driven sleeve mounted on the driven rotor, a driven shaft mounting the driven sleeve for longitudinal sliding movement and for rotation therewith, a thrust bearing element on the driven sleeve, a thrust bearing ring cooperating therewith, and means carried by the driving sleeve and operable by rotation thereof for shifting the driven sleeve and driven rotor with respect to said driving rotor, whereby clearance between the rotors will be automatically controlled for permitting transmission of all available power at a given engine speed from the driving rotor to the driven rotor, said last mentioned means including a weight engaging the thrust bearing ring to shift the driven rotor toward the driving rotor, means pivotally mounting the weight on the driving sleeve, a spring on said last mentioned means urging the weight to full operative position whereby the driving rotor and driven rotor will be positioned adjacent each other at slow speed, said driving rotor and driven rotor being spread apart by shearing action of liquid within the casing between the rotors at moderate speed, said weight being operative by centrifugal force for overcoming the shearing action of the liquid and moving the driven rotor toward the driving rotor at high speed.

HARRY W. ADDISON, Jr.